United States Patent
Kawashima

(10) Patent No.: US 6,811,847 B2
(45) Date of Patent: Nov. 2, 2004

(54) PRINTING MEDIA

(75) Inventor: Tadasu Kawashima, Kanuma (JP)

(73) Assignee: Sony Chemicals Corporation, Tokyo (JP)

( * ) Notice: Subject to any disclaimer, the term of this patent is extended or adjusted under 35 U.S.C. 154(b) by 0 days.

(21) Appl. No.: 09/826,391

(22) Filed: Apr. 4, 2001

(65) Prior Publication Data

US 2002/0039633 A1 Apr. 4, 2002

(30) Foreign Application Priority Data

Apr. 4, 2000 (JP) .......................................... 2000-102100

(51) Int. Cl.[7] .................................................. B32B 7/12
(52) U.S. Cl. ...................... 428/40.1; 428/41.9; 428/343; 428/349; 428/353; 427/290; 427/299; 427/307
(58) Field of Search ................................. 428/40.1, 41.9, 428/343, 349, 353; 427/290, 299, 307

(56) References Cited

U.S. PATENT DOCUMENTS

| | | | | |
|---|---|---|---|---|
| 2,532,011 A | * | 11/1950 | Hendricks et al. | 428/40.1 |
| 3,876,454 A | * | 4/1975 | Snell et al. | 428/336 |
| 4,587,158 A | * | 5/1986 | Ewing | 428/219 |
| 5,563,023 A | * | 10/1996 | Kangas et al. | 430/273.1 |
| 5,663,288 A | * | 9/1997 | Shinoda et al. | 528/354 |
| 5,861,192 A | * | 1/1999 | Nakata et al. | 427/322 |
| 6,162,858 A | * | 12/2000 | Auguste et al. | 524/492 |
| 6,235,825 B1 | * | 5/2001 | Yoshida et al. | 524/314 |
| 6,357,871 B1 | * | 3/2002 | Ashida et al. | 347/106 |

FOREIGN PATENT DOCUMENTS

| | | | |
|---|---|---|---|
| JP | 07-330929 | * | 12/1995 |
| JP | 08-267968 | * | 10/1996 |
| JP | 11322949 | * | 11/1999 |
| JP | 411322949 | * | 11/1999 |

* cited by examiner

Primary Examiner—Harold Pyon
Assistant Examiner—Brian P. Egan
(74) Attorney, Agent, or Firm—Osha & May L.L.P.

(57) ABSTRACT

A printing medium is manufactured by forming a primer layer 12 and an adhesive layer 13 successively on the rubbed surface of a base film 11 and wound into a roll 15. When the printing medium is delivered from roll 15, adhesive layer 13 does not remain on the roll 15 side even if adhesive layer 13 has a low adhesive power because the adhesion between adhesive layer 13 and primer layer 12 is strong while the adhesion between adhesive layer 13 and base film 11 in roll 15 is weak. The printing medium can be run in a printer without using a release film because adhesive layer 13 has a low adhesive power.

39 Claims, 4 Drawing Sheets

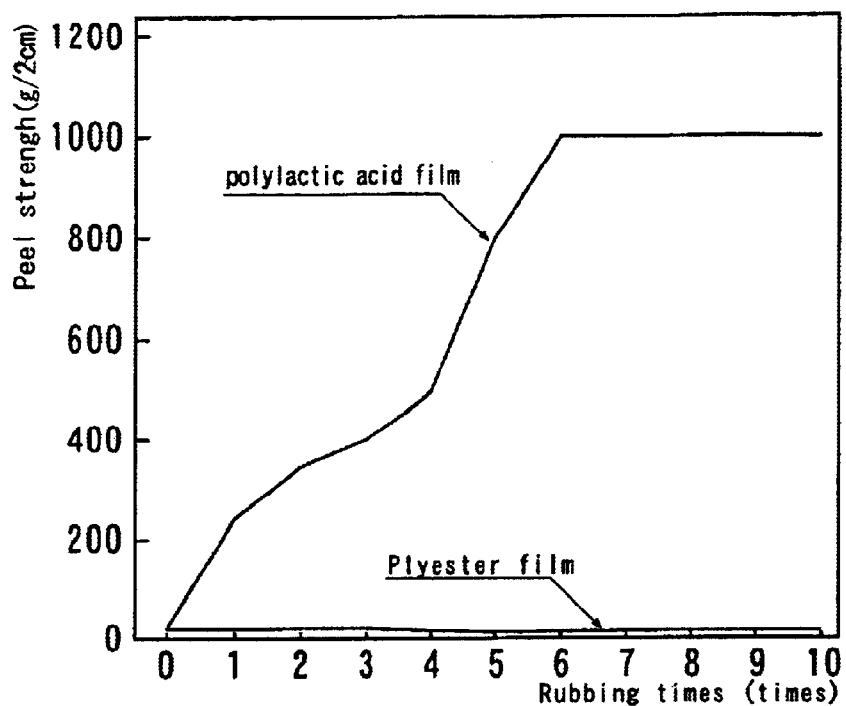
Fig. 8
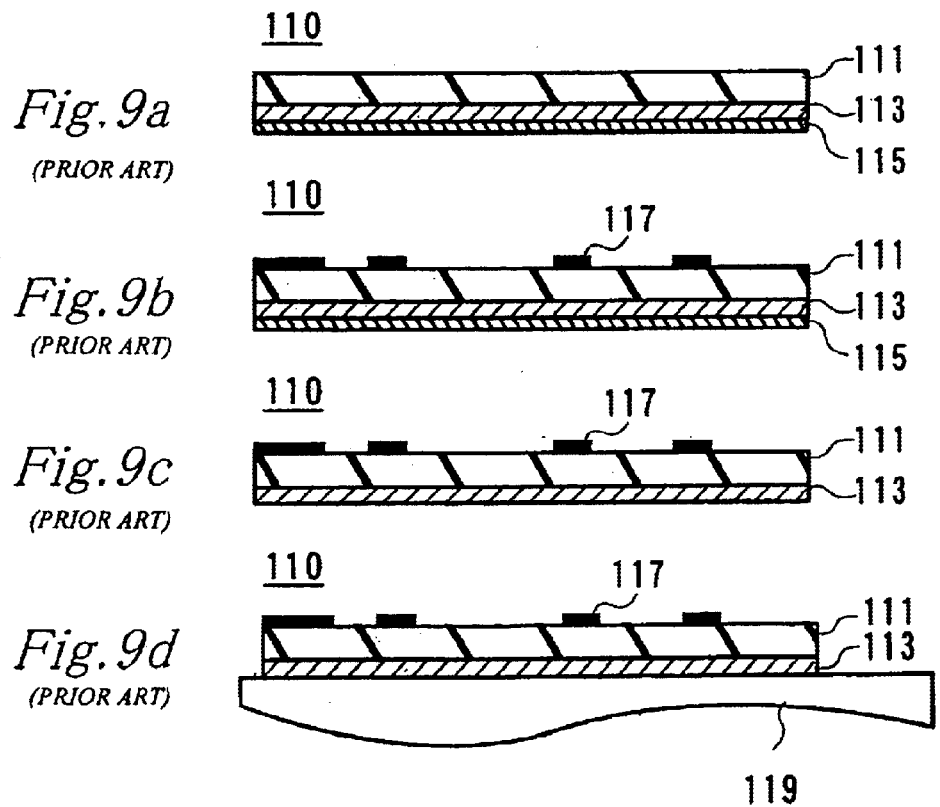
Fig. 9a (PRIOR ART)
Fig. 9b (PRIOR ART)
Fig. 9c (PRIOR ART)
Fig. 9d (PRIOR ART)

PRINTING MEDIA

FIELD OF THE INVENTION

The present invention relates to the technical field of printing media, particularly printing media free from release papers.

PRIOR ART

Narrow printing media having an adhesive layer have been widely used to print names or prices.

Reference 110 in FIG. 9(a) represents an example of a printing medium of the prior art, comprising a base film 111 for receiving ink, an adhesive layer 113 formed on the bottom of said base film and a release film 115 applied on the surface of adhesive layer 113.

This printing medium 110 is mounted on a printer and ink 117 is transferred onto the top surface of base film 111 in a desired pattern via a heat transfer film or the like (FIG. 9(b)).

Printing medium 110 having ink 117 transferred onto the top surface of base film 111 is delivered outside the printer, and then printing medium 110 is cut into an appropriate length and release film 115 is separated to expose the surface of adhesive layer 113 (FIG. 9(c)).

Then, the surface of adhesive layer 113 is pressed against the surface of a substrate 119 so that printing medium 110 representing a name or the like by ink 117 is adhered to substrate 119 (FIG. 9(d)).

However, release film 115 is discarded as waste and may generate hazardous materials upon incineration. The same problem may occur if printing medium 110 on substrate 119 becomes unnecessary and should be removed for disposal. Especially when base film 111 consists of a polyester resin and adhesive layer 113 consists of an acrylic resin, a typical disposal method is incineration for volume reduction.

A possible solution is to prepare a printing medium by applying an adhesive tape under recent study having a biodegradable base film or release film, which is spontaneously degraded by microorganisms after disposal.

However, any commercial printing media have not been obtained because of the low adhesion between the biodegradable film and the adhesive layer.

Adhesion is slightly improved by corona treatment on the surface of the base film, but the effect is relatively small for plant investment.

An object of the present invention is to overcome the above disadvantages of the prior art and to provide a biodegradable printing medium.

DISCLOSURE OF THE INVENTION

We found that when an adhesive layer is formed on the surface of a biodegradable film such as a polylactic acid film or a Bionolle film after it is rubbed with a rubbing means such as a cotton cloth or a buff (nylon brush), the adhesive strength (peel strength) between the film and the adhesive layer is improved. Such rubbing treatment is common for controlling the orientation of liquid crystal, but has not been applied to solids or semisolids such as an adhesive layer.

Contrary to the conventional rubbing treatment in the same direction, the present invention needs no directivity.

On the basis of the above finding, the present invention provides a printing medium comprising a base film and an adhesive layer formed on one side of the base film while the other side of the base film forms a printable face, wherein a surface of the base film is subjected to rubbing treatment with a rubbing means and then the adhesive layer is formed on a rubbed surface and the printing medium is wound into a roll wherein the adhesive layer and the printable face of the base film are in close contact with each other.

The present invention provides the printing medium wherein the adhesive layer is formed by applying and then drying an adhesive layer starting solution containing an adhesive in an organic solvent on the rubbed surface of the base film.

The present invention provides a printing medium comprising a base film, a primer layer formed on one side of the base film and an adhesive layer formed on a surface of the primer layer while the other side of the base film forms a printable face, wherein a surface of the base film is subjected to rubbing treatment with a rubbing means and then the primer layer is formed on a rubbed surface and the printing medium is wound into a roll wherein the adhesive layer and the printable face of the base film are in close contact with each other.

The present invention provides the printing medium wherein the primer layer contains a biodegradable colorant.

The present invention provides the printing medium wherein the primer layer is formed by applying and then drying a primer layer starting solution containing an adhesive in an organic solvent on the rubbed surface of the base film.

The present invention provides the printing medium wherein the adhesive layer is formed by applying and then drying an aqueous adhesive layer starting solution on the primer layer.

The present invention provides the printing medium wherein the base film is biodegradable.

The present invention provides the printing medium wherein the adhesive layer does not inhibit the biodegradability of the base film and contains an opaque filler.

The present invention provides the printing medium wherein the base film has a polylactic acid film and the surface of the polylactic acid film is subjected to the rubbing treatment.

The present invention provides the printing medium wherein the polylactic acid film is a biaxially oriented polylactic acid film.

The present invention provides the printing medium wherein the base film has a Bionolle film and the surface of the Bionolle film is subjected to the rubbing treatment.

The present invention provides the printing medium wherein adhesive components contained in the adhesive layer are based on an adhesive not inhibiting the biodegradability of the base film.

The present invention provides the printing medium wherein the adhesive is natural rubber.

The present invention provides the printing medium wherein the adhesive is a polyisoprene rubber.

The present invention provides the printing medium wherein the adhesive layer contains an antiaging agent.

The present invention provides the printing medium wherein the printable face is subjected to rubbing treatment with a rubbing means.

The present invention provides the printing medium wherein a biodegradable receiving layer is formed on the surface of the printable face.

Thus, the present invention provides a printing medium comprising a base film consisting of a biodegradable film such as a polylactic acid film or a Bionolle film and an adhesive layer disposed on one side of the base film while the other side forms a printable face.

The surface of the base film is rubbed with a rubbing means desired times and then a primer layer starting solution or an adhesive layer starting solution is applied and dried on the rubbed surface. Therefore, the adhesion between the primer layer or adhesive layer and the base film is increased.

If a printing medium of the prior art is wound into a roll without using a release film, only the base film is separated while the adhesive layer remains on the roll side because of the low adhesion between the biodegradable film and the adhesive layer when the printing medium is delivered for use.

In printing media of the present invention, the adhesive layer and the base film are not separated because the adhesion between the base film and the adhesive layer is increased by subjecting the surface of the base film to rubbing treatment.

The biodegradable base film is typically clear. When an opaque printing medium is to be manufactured, it is preferable to add a filler or colorant not inhibiting the biodegradability of the base film, adhesive layer and primer layer to the adhesive layer or primer layer.

Experiments proved that when the adhesive layer starting solution contains water as a solvent, the adhesion between the adhesive layer and the base film is not increased even if the surface of the base film is rubbed and the adhesive layer starting solution is applied and dried on the rubbed surface. In this case, it is preferable to apply a primer layer starting solution containing an adhesive in an organic solvent on the rubbed surface of the base film to form a primer layer followed by forming adhesive layer on the surface of the primer layer.

The primer layer may have a smaller thickness than that of the adhesive layer to reduce the amount of organic solvents used for manufacturing a printing medium.

The effect of rubbing treatment on the improvement of the adhesion between the base film and the adhesive layer is attained with not only biodegradable films but also resin films such as polyester films or polyimide films. Rubbing treatment is especially effective when a rubber-based adhesive layer is formed on the surface of such a resin film.

BRIEF DESCRIPTION OF THE DRAWINGS

FIG. 8 is a graph showing the relationship between rubbing times and peel strength.

FIGS. 9($a$)–($d$) illustrates a printing medium of the prior art and a method for using it.

THE MOST PREFERRED EMBODIMENTS OF THE INVENTION

First, a printing medium according to an embodiment of the present invention and a process for preparing it are explained.

Figure 1:
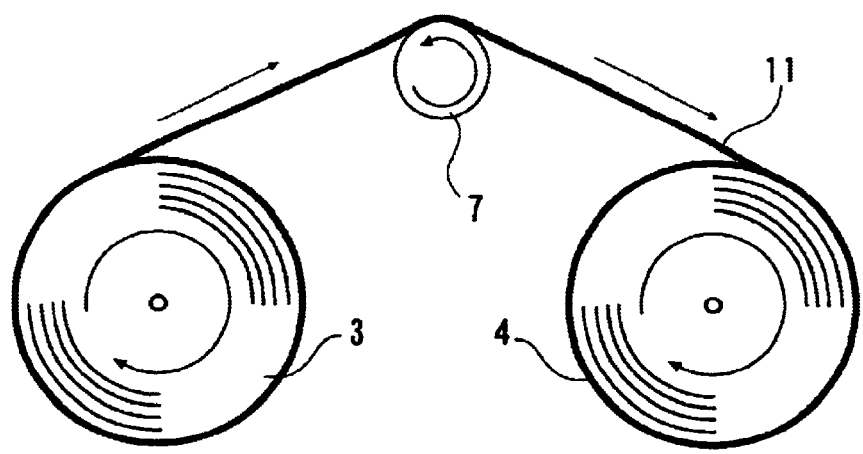
FIG. 1 illustrates a process for manufacturing a printing medium of the present invention.

Referring to FIG. 1, a feed roll 3 on which a base film 11 consisting of a polylactic acid film (biaxially oriented film of a "Lacty" from Shimadzu) having a thickness of 50 $\mu$m is wound and a rubbing means 7 consisting of a flexible rubbing cloth such as a cotton cloth applied on the surface of a roll body are prepared, and base film 11 is drawn from feed roll 3 and passed over rubbing means 7 and taken up on take-up roll 4.

During then, rubbing means 7 is rotated in the direction reverse to the running direction of base film 11 to rub the surface of base film 11 in a dry atmosphere (normal temperatures, normal pressures in atmosphere) for rubbing treatment.

Then, base film 11 taken up on take-up roll 4 is delivered and moved in a typical adhesive layer forming apparatus where a primer layer starting solution containing 98 parts by weight of natural rubber and 2 parts by weight of chlorophyll (i.e. biodegradable pigment) dissolved in toluene is applied on the rubbed surface and then dried into a primer layer of 1 $\mu$m in thickness. Reference 12 in FIG. 2 represents such a primer layer.

Figure 2A:
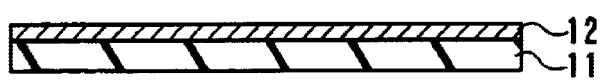
FIGS. 2($a$), ($b$) illustrates a process for manufacturing a printing medium of the present invention.
Figure 2B:
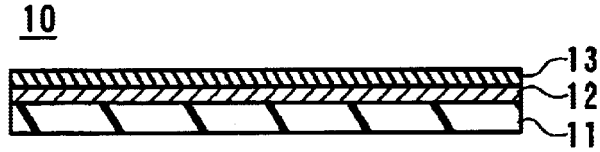

Then, an adhesive layer starting solution containing 95 parts by weight of natural rubber and 5 parts by weight of titanium oxide mixed and dispersed in water is applied on the surface of primer layer 12 and dried into an adhesive layer 13 of 9 $\mu$m in thickness to give a printing medium 10 (FIG. 2($b$)).

Figure 6:
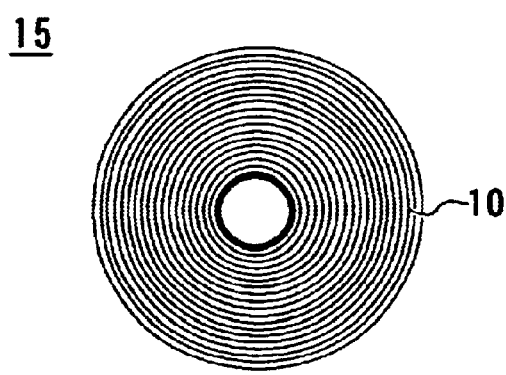
FIG. 6 illustrates a printing medium of the present invention wound into a roll.

When this printing medium 10 is wound with adhesive layer 13 inside, adhesive layer 13 is brought into close contact with base film 11 so that plies of the printing medium are bonded to each other with adhesive layer 13 into a roll as shown by reference 15 in FIG. 6.

Figure 7A:
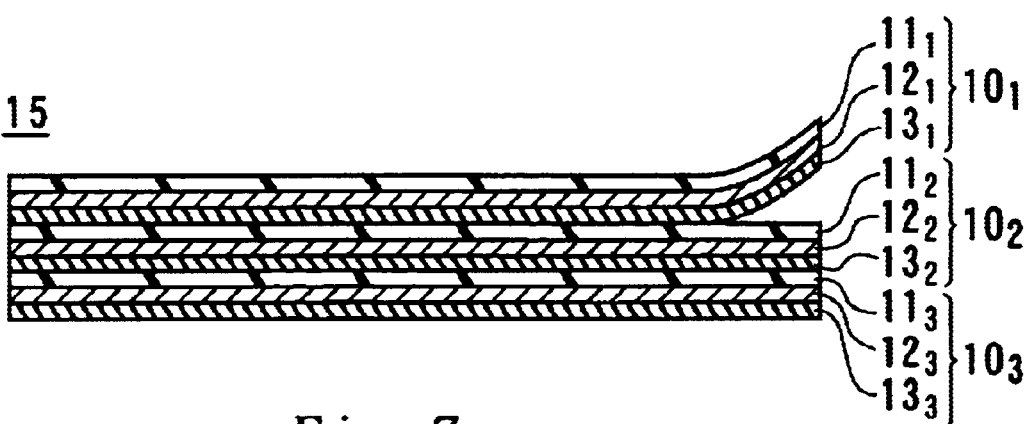
FIGS. 7($a$)–($c$) illustrates a method for using a printing medium of the present invention.
Figure 7B:
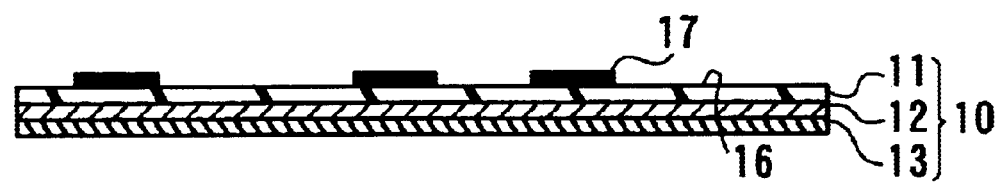
Figure 7C:
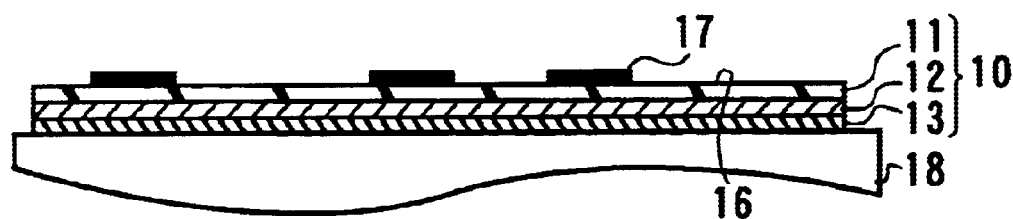

Reference $10_1$ in FIG. 7($a$) represents an outermost ply of the printing medium of roll 15 and references $10_2$, $10_3$ represent lower plies of the printing medium. Plies $10_1$–$10_3$ form a continuous film. References $11_1$–$11_3$, $12_1$–$12_3$, $13_1$–$13_3$ represent a base film, primer layer and adhesive layer forming each ply $10_1$–$10_3$ of the printing medium.

Outermost ply $10_1$ of the printing medium can be finely separated from this roll 15 because the adhesion between primer layer 12 and adhesive layer 13 is very strong and the adhesion between base film 11 and primer layer 12 has been increased by rubbing treatment while the adhesion between adhesive layer 13 and base film 11 is weak. Printing medium 10 separated from the roll was not even curled.

Biodegradable adhesive layer 13 such as natural rubber has a low adhesive power so that it cannot hinder separated printing medium 10 from running in a printer.

FIG. 7($b$) shows the state in which ink 17 has been thermally transferred from a heat transfer film onto printable face 16 on the top surface of base film 11 in a printer. It should be noted that the printability of polylactic acid films is generally excellent.

FIG. 7($c$) shows the state in which adhesive layer 13 has been brought into close contact with substrate 18 and pressed against it to adhere printing medium 10 onto substrate 18. Visibility is good because ink 17 is placed on printing medium 10 in a white color developed by chlorophyll and titanium oxide contained in primer layer 12 and adhesive layer 13.

The above printing medium 10 was measured for adhesive strength (peel strength). As a result, the adhesive strength between base film 11 (polylactic acid film) and primer layer 12 was 800 g/2 cm and the adhesive strength between substrate 18 consisting of a stainless steel plate and adhesive layer 13 was 50 g/2 cm.

For comparison, primer layer 12 was formed on the surface of base film 11 consisting of the same polylactic acid film as used above without rubbing the surface of base film 11 with rubbing means 7. As the result, the adhesive strength between base film 11 and primer layer was only 30 g /2 cm.

Typically, the adhesion between primer layer 12 and adhesive layer 13 is stronger than the adhesion between base film 11 and primer layer 12. When printing medium 10 is separated from substrate 18, adhesive layer 13 cannot remain on the substrate 18 side because adhesive layer 13 is separated from the surface of substrate 18 together with base film 11 and primer layer 12 without being separated from primer layer 12.

The above rubbing means 7 may be a cloth of Japanese paper, carbon fiber, nylon, rayon or the like. Rubbing means consisting of hard materials are also effective to improve adhesion, but scratch base film 11. Therefore, flexible materials such as velvet are preferred when transparency is required.

In addition to natural rubber (natural isoprene rubber), suitable adhesives for forming the adhesive layer 13 include various rubber-based adhesives such as synthetic isoprene rubbers, nitrile rubbers, SBR rubbers (styrene-butadiene rubbers), etc. However, natural and synthetic isoprene rubbers are desirable from the viewpoint of biodegradability.

In the present invention, the thickness of the base film such as a polylactic acid film is not limited to 50 µm, but the same effect as described above was obtained in case of 25 µm. Curling was observed in a printing medium delivered from a roll in case of 15 µm. Printing contrast was deteriorated when the adhesive layer starting solution has 1 part by weight of titanium oxide relating to 99 parts by weight of natural rubber. Therefore, titanium oxide should desirably be contained in an amount of more than 1% by weight of total solids (total amounts of rubber components and pigments).

Commercially available tapes using a release film are sufficient in adhesive strength and curling properties, but waste-making and unbiodegradable.

Although the surface of base film 11 directly serves as printable face 16 in the foregoing embodiment, both sides of base film 11 may be rubbed by rubbing means 7 to provide a rubbed printable face 16. In this case, transfer of ink from ink ribbons and fixability of ink 17 become more reliable.

When printing medium 10 having both sides of base film 11 rubbed is wound into a roll, the rubbed top surface of base film 11 is brought into close contact with adhesive layer 13 but the adhesion between adhesive layer 13 and base film 11 does not unnecessarily increase because the adhesive layer starting solution has not been applied on the rubbed top surface of base film 11.

Figure 3:
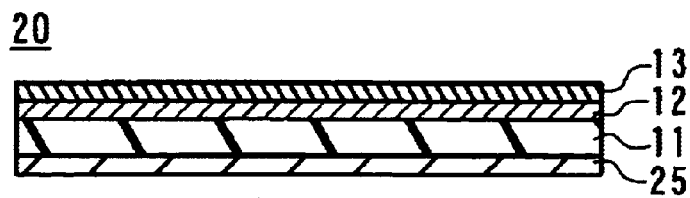
FIG. 3 is a sectional view showing an example of a printing medium of the present invention.

Reference 20 in FIG. 3 represents another example of a printing medium of the present invention wherein ink-receiving layer 25 is provided on the side of base film 11 opposite to primer layer 12 and adhesive layer 13. This ink-receiving layer 25 is based on an aqueous resin such as polyvinyl alcohol dosed with a white pigment such as titanium oxide. This printing medium 20 can also be wound into a roll and mounted on a name printer or the like.

This printing medium 20 can also be used in inkjet printers because ink-receiving layer 25 absorbs and fixes aqueous inks.

When ink-receiving layer 25 is formed, both sides of base film 11 are rubbed with rubbing means 7 and an ink-receiving layer starting solution dispersed in an organic solvent is applied on the rubbed top surface of base film 11 to form ink-receiving layer 25 so that the adhesion between ink-receiving layer 25 and base film 11 can be improved to prevent ink-receiving layer 25 from slipping from printing medium 10.

Figure 4:
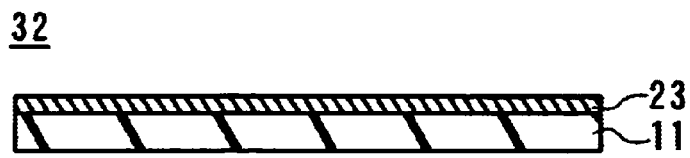
FIG. 4 is a sectional view showing another example of a printing medium of the present invention.

Reference 32 in FIG. 4 represents a printing medium wherein an adhesive layer starting solution dispersed in an organic solvent is applied on the rubbed surface of base film 11 to form adhesive layer 23. This printing medium 32 also shows increased adhesion between adhesive layer 23 and base film 11.

In this printing medium 32 wherein the top of base film 11 serves as a printable face, both sides of base film 11 may be rubbed with rubbing means 7 to provide the exposed side of the rubbed surface of the base film 11 as a printable face.

Figure 5:
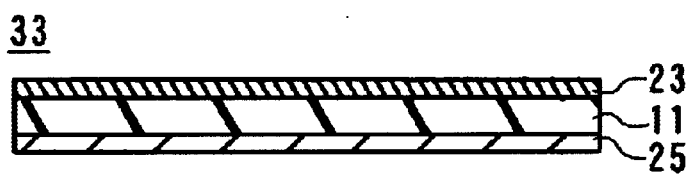
FIG. 5 is a sectional view showing still another example of a printing medium of the present invention.

Reference 33 in FIG. 5 represents a printing medium having ink-receiving layer 25 formed on the side of the above printing medium 32 on which adhesive layer 23 is not formed. This ink-receiving layer 25 can be formed on the rubbed surface of base film 11.

Measurement results of adhesive strength between biodegradable base films and adhesive layers or primer layers are described below.

EXAMPLE 1

First, a synthetic isoprene rubber (trade name "IR-10" from Kuraray) was dissolved in toluene to prepare an adhesive layer starting solution having 10% by weight of solids, and then the surface of a base film consisting of a polylactic acid film was rubbed with a rubbing means consisting of a cotton cloth ten times with care not to scratch it (rubbing treatment) and the adhesive layer starting solution was applied on the rubbed surface of the base film 11 and toluene was evaporated by drying at 80° C. for 5 minutes to give an adhesive layer 23 (isoprene rubber layer)of 10 µm in thickness.

Then, the base film 11 on which adhesive layer 23 has been formed was rolled into a printing medium 32. Separately, the base film 11 on which adhesive layer 23 has been formed was cut in two halves, which were bonded together into a test film with adhesive layers 23 facing each other.

The self-bonding strength of the test film was determined to be 800 g/2 cm. The peeling face was located at cohesive failure of isoprene rubber.

Then, test sheets were prepared under the same conditions as above but varying rubbing times and measured for self-bonding strength. The results are shown in Table 1 below.

TABLE 1

Relationship between rubbing times and self-bonding strength

| Number of time | Self bonding strength |
| --- | --- |
| 1 | 250 |
| 2 | 350 |
| 3 | 400 |
| 4 | 500 |
| 5 | 800 |
| 6 | 800 |
| 7 | 800 |
| 9 | 800 |
| 10 | 800 |
| | (g/2 cm) |

Table 1 above shows that 5 or more times of rubbing with a cotton cloth are effective to improve adhesion.

Comparative Example 1

A test film was prepared in the same manner as in Example 1 above except that rubbing treatment with a rubbing means was omitted, and the self-bonding strength was determined to be 30 g/2 cm. The peeling face was located at the interface between the base film and the adhesive layer.

Comparative Example 2

A test film was prepared under the same conditions as in Example 1 above except that the surface of the base film was corona treatment in place of rubbing treatment. The strength was determined to be 50 g/2 cm. The strength was higher than that of Comparative example 1, but the peeling face was located at the interface between the base film and the adhesive layer.

Another test film was prepared under the same conditions as in Example 1 above except that the surface of the base film was subjected to a surface treatment by UV irradiation in place of rubbing treatment. The self-bonding strength was determined to be 30 g/2 cm, which was equal to the strength of Comparative example 1 using an untreated base film. The peeling face was also located at the interface between the base film and the adhesive layer.

EXAMPLE 2

EXAMPLE 2a

A nitrile rubber (trade name "Nipol 1042" from Nippon Zeon) was masticated and then dissolved in MEK (methyl ethyl ketone) to prepare an adhesive layer starting solution.

The surface of a base film 11 consisting of a biaxially oriented polyester film of 50 $\mu$m in thickness was rubbed with steel wool ten times, and then the adhesive layer starting solution was applied and dried on the rubbed surface into an adhesive layer 23 to prepare a printing medium 32. A test film was prepared from this printing medium 32 by bonding two halves with adhesive layers 23 facing each other in the same manner as in Example 1 above and the self-bonding strength was determined to be 3000 g/2 cm.

EXAMPLE 2b

Natural rubber was dissolved in toluene to prepare an adhesive layer starting solution. The surface of a base film 11 consisting of a biaxially oriented polylactic acid film of 50 $\mu$m in thickness was rubbed with a cotton wiper ten times and then the adhesive layer starting solution was applied and dried on the rubbed surface, and the self-bonding strength was determined by the same procedure as in Example 1. The adhesive strength was 1000 g/2 cm.

EXAMPLE 2c

A block SIS (styrene-isoprene type) rubber (trade name "TR1107" from Showa Shell Sekiyu KK) was dissolved in toluene to prepare an adhesive layer starting solution. The surface of a base film 11 consisting of a polyimide film of 50 $\mu$m in thickness was rubbed with a nylon brush (buff) ten times and then the adhesive layer starting solution was applied and dried on the rubbed surface, and the self-bonding strength was determined by the same procedure as in Example 1. The adhesive strength was 600 g/2 cm.

Comparative Example 3

Printing media were prepared under the same conditions as in Examples 2a–2c except that the surface of the base film was not rubbed, and the self-bonding strength was determined. The adhesive strengths of counterparts of Examples 2a–2c were 900 g/2 cm, 30 g/2 cm and 10 g/2 cm, respectively. The peeling faces were located at the interface between the adhesive layer and the base film.

Therefore, rubbing treatment of the surface of the base film allows the surface of the film and the adhesive applied on the surface to be oriented, thereby achieving a bonding strength three times or more greater than obtained without rubbing treatment.

This Comparative example 3 particularly shows that the present invention can improve the low adhesive strength between a rubber-based adhesive layer and a base film only by rubbing a treatment in contrast to the prior art in which a primer layer was formed.

Comparative Example 4

A test film was prepared in the same manner as in Example 1 except that the surf ace of a base film consisting of a polyester film in place of a polylactic acid film was rubbed with a rubbing means consisting of a cotton wiper, and the self-bonding strength was determined. The results are shown in the graph of FIG. 8 along with the results from a polylactic acid film.

The effect of surface rubbing on the improvement of adhesion is remarkable when the base film consists of a polylactic acid film, but such an effect does not appear when the base film consists of a polyester film.

EXAMPLE 3

A test film was prepared under the same conditions as in Example 1 except that the surface of the base film consisting of a polylactic acid film was rubbed with a rubbing means consisting of a buff (nylon brush) for buff rubbing and the self-bonding strength was determined. Buff rubbing was performed under the conditions of a pressure of 1 kg/cm at a speed of 4 m/min. No abrasive was used. The adhesive strength of the test strip was 1000 g/2 cm. The effect of buff rubbing on the improvement of adhesion is greater than a cotton cloth.

The following example illustrates a printing medium using a base film subjected to rubbing treatment with reduced amount of organic solvents.

EXAMPLE 4

The surface of a base film 11 consisting of a polylactic acid film was rubbed with a rubbing means consisting of a cotton cloth ten times with care not to scratch it and a primer layer starting solution containing 5% by weight of natural rubber (grade name "RSS1") in toluene was applied and dried on the rubbed surface to give a primer layer 12 of 1 $\mu$m in thickness.

An adhesive layer starting solution comprising natural rubber latex ("latex" means that natural or synthetic rubber or a plastic is suspended in water) was applied and dried on primer layer 12 into an adhesive layer 13 of 10 $\mu$m in thickness to prepare a printing medium 10 in which primer layer 12 and adhesive layer 13 are superposed on base film 11.

Then, printing medium 10 was cut in two halves, which were bonded together into a test film with adhesive layers 13 facing each other and the self-bonding strength was determined. This printing medium 10 was adhered to a stainless steel (SUS) substrate and the adhesion to stainless steel was determined.

Comparative Example 5

The same natural rubber latex as used in Example 4 was directly applied and dried on the base film subjected to rubbing treatment used in Example 4 without forming a primer layer to form an adhesive layer of 10 μm in thickness, whereby a printing medium was prepared. This printing medium was also measured for self-bonding strength and adhesion to stainless steel in the same manner as in Example 4.

Comparative Example 6

A solution containing 5% by weight of the natural rubber used to form a primer layer in Example 3 in toluene was applied and dried on the base film subjected to rubbing treatment used in Example 4 to form an adhesive layer of 10 μm in thickness, whereby a printing medium was prepared. This printing medium was also measured for self-bonding strength and adhesion to stainless steel.

Comparative Example 7

The same primer layer and adhesive layer as in Example 4 were superposed on a polylactic acid film without rubbing treatment, and the self-bonding strength and adhesion to stainless steel were determined.

Measurement Results

Measurement results of Example 4 and Comparative examples 5, 6 and 7 are shown in the table 2 below.

TABLE 2 printing media using natural latex

|  | Self-bonding strength | Adhesion to sus | Peeling site |
| --- | --- | --- | --- |
| Example 4 | 500 | 20 | Adhesive side |
| Co. example 5 | 40 | 20 | Polylactic asid fim side |
| Co. example 6 | 1000 | 30 | Adhesive side |
| Co. example 7 | 30 | 20 | Polylactic asid fim side |
|  | (g/2 cm) |  |  |

Peeling sites were located on the adhesive side in Example 4, but between the base film and the adhesive layer in Comparative example 5 and between the base film and the primer layer in Comparative example 7.

Measurement results of Comparative example 7 in Table 2 above show that the adhesion to the base film is not improved without rubbing treatment. Measurement results of Comparative example 5 show that adhesion is not improved even when natural rubber latex is applied on the rubbed surface of a base film.

In contrast, Example 4 and Comparative example 6 show that the effect of rubbing the base film is significant with natural rubber (grade name "RSS1").

However, 190 g/m² of toluene was used to form an adhesive layer of 10 μm in Comparative example 6 as compared with Example 4 in which 19 g/m² of toluene was used to form a primer layer 22 of 1 μm, i.e., the amount of toluene used in Example 4 is 1/10 of Comparative example 6.

In view of the trend toward world-wide control of the release of organic solvents to the atmosphere, it is desirable to reduce the amount of organic solvents used as possible. The effect of rubbing treatment is small when natural rubber latex is directly applied without using an organic solvent to form an adhesive layer as in Comparative example 5 above, but a little amount of organic solvents suffice if a thin primer layer is inserted between the adhesive layer and the base film as in Example 4.

The following example illustrates a printing medium using a biaxially oriented polylactic acid film.

EXAMPLE 5

A base film 11 consisting of a biaxially oriented polylactic acid film of 40 μm in thickness was rubbed in the same manner as in Example 1. A solution containing 6 parts by weight of natural rubber, 4 parts by weight of natural rosin and 90 parts by weight of toluene was applied and dried on the rubbed surface into an adhesive layer 23 to prepare a printing medium 32.

This printing medium 32 was measured for the adhesion between adhesive layer 23 and base film 11, the adhesion to stainless steel when printing medium 23 was adhered to a stainless steel substrate, and film tensile strength and film elongation ratio.

Comparative Example 8

A printing medium was prepared under the same conditions as in Example 5 except that rubbing treatment was omitted and the same measurements as in Example 5 were made.

Measurement Results

Measurement results of Example 5 and Comparative example 8 are shown in Table 3 below. Measurement results of commercial product 1 (trade name "PP packing tape" from NITTO DENKO) are also shown.

TABLE 3

Printing media using a biaxial oriented polylactic asid film

|  | Example 5 | Co. example 8 | Commercial product 1 |
| --- | --- | --- | --- |
| Adhesion to SUS (g/2 cm) | 500 | 500 | 500 |
| Adhesion to base film (g/2 cm) | 1000 | 500 | Not determined |
| Film tensile strength (kg) | 5 | 5 | 11.5 |
| Film elongation ratio | 260 | 260 | 300 |

Commercial product 1: PP packing tape from NITTO DENKO

If the printing medium of Comparative example 8 is adhered to a stainless steel substrate, the adhesive may be transferred to the substrate side when the printing medium is separated because the adhesion of the adhesive layer to the base film is equal to the adhesion to the substrate in Comparative example 8.

In contrast, adhesive layer 23 cannot be transferred to the substrate side in Example 5 because the adhesion of base film 11 to the rubbed surface is stronger.

Therefore, a printing medium consisting of wholly biodegradable materials can be manufactured by subjecting a biaxially oriented polylactic acid film to rubbing treatment according to the present invention as mentioned above. This printing medium can be wound into a roll for use as a packing tape or the like.

It is necessary to manufacture an opaque printing medium because printing media using a biaxially oriented polylactic acid film have the disadvantage that they are clear and absorbed to the color of the substrate to hardly distinguish adhered sites when the thickness of the adhesive layer is 50 μm or less.

EXAMPLE 6

A solution containing 6 parts by weight of natural rubber and 0.6 parts by weight of calcium carbonate dissolved in 93.4 parts by weight of toluene was applied and dried on the surface of a biaxially oriented polylactic acid film (40 μm in thickness) subjected to rubbing treatment in the same manner as in Example 1 to form an adhesive layer of 10 μm in thickness, whereby a printing medium was prepared.

Natural rubber is an adhesive and calcium carbonate is an opaque filler.

Comparative Example 9

A printing medium was prepared in the same manner as in Example 6 except that rubbing treatment was omitted, and the adhesion was determined.

Comparative Example 10

A printing medium was prepared in the same manner as in Example 6 except that calcium carbonate was not added, and the adhesion was determined.

Measurement Results

These printing media were measured for the adhesion between the base film and the adhesive layer, the adhesion when each printing medium was adhered to stainless steel, and transmittance and biodegradability mentioned below.
Biodegradability : The printing media is introduced into a composter (a reactor) filled with fully ripened compost material and externally thermostated at 70 Celusius degree. The composter is aerated during the period of the test with pre-thermostated and steam-saturated air. The weight loss of the printing media is determined in percent. When the weight loss is 60% or more, the evaluation of the test is ○. When the weight loss is less than 60%, the evaluation of the test is X.

Measurement results are shown in table 4 below.

TABLE 4

Printing media containing calcium carbonate

|  | Example 6 | Co. example 9 | Co. example 10 |
| --- | --- | --- | --- |
| Adhesion to SUS (g/2 cm) | 30 | 30 | 30 |
| Adhesion to base film (g/2 cm) | 1000 | 30 | 1000 |
| Transmittance (%) | 0 | 0 | 90 |
| Biodegradability | yes | yes | yes |

Example 6 shows that rubbing effect on the improvement of adhesion is also obtained when an opaque filler (calcium carbonate) is contained in the adhesive layer. The transmittance of the printing medium of Example 6 is zero so that the color of the substrate is completely hidden and adhered sites can be readily distinguished. The addition of an opaque filler (calcium carbonate) cannot inhibit biodegradability.

In contrast, the adhesive of Comparative example 9 may be transferred to the substrate because of the low adhesion for lack of rubbing treatment. The printing medium of Comparative example 10 is difficult to distinguish during adhesion due to the high transmittance.

Calcium carbonate is a desirable opaque filler derived from biological sources because it can be produced from shells, but the present invention is not limited to calcium carbonate.

Water-insoluble opaque materials having a neutral pH such as aluminium oxide can also be used.

Although an additive (filler) was added to the adhesive layer to opacify it in Example 6 above, discrimination from substrates can also be made possible by coloring. In the latter case, biodegradable pigments must be added not to inhibit the biodegradability of the polylactic acid film.

EXAMPLE 7

A solution containing 5 parts by weight of natural rubber and 0.05 parts by weight of chlorophyll dissolved in 94.95 parts by weight of toluene was applied and dried on the surface a polylactic acid film rubbed in the same manner as in Example 1 to form an adhesive layer of 10 μm in thickness, whereby a printing medium was prepared.

The adhesion was comparable to those obtained with no colorant. Biodegradability was also uninhibited.

Chlorophyll was found to be suitable for practical use because it is oil-soluble so that the pigment cannot dissolve even when this printing medium is placed in water.

EXAMPLE 8

A printing medium was prepared under the same conditions as in Example 7 except that chlorophyll was replaced by carotene (oil-soluble). The adhesion was comparable to that of Example 7, and neither inhibition of biodegradability nor dissolution of pigment in water was observed.

Comparative Example 11

A printing medium was prepared under the same conditions as in Example 7 except that chlorophyll was replaced by a food colorant consisting of a triphenylmethane type pigment (Food additive Pigment Blue No. 1). When the printing medium was placed in water, Food Pigment Blue No. 1 dissolved because it is water-soluble. The results were same when Food Pigment Blue No. 1 was replaced by a food colorant consisting of an indigoid pigment (Food Pigment Blue No. 2).

Comparative Example 12

A printing medium was prepared under the same conditions as in Example 7 except that chlorophyll was replaced by "Aizen Spilon Green GNH" from Hodogaya Chemical (non-food additive oil-soluble pigment). The pigment did not dissolve in water, but biodegradability did not advance on the coated side.

Then, an opaque filler consisting of calcium carbonated used in Example 6 was added into the adhesive layer together with a pigment.

EXAMPLE 9

A solution containing 5 parts by weight of natural rubber, 0.05 parts by weight of copper chlorophyll and 0.5 parts by weight of calcium carbonate dissolved in toluene was applied and dried on the surface a polylactic acid film subjected to the same rubbing treatment as in Example 1 to form an adhesive layer of 20 μm in thickness, whereby a printing medium was prepared.

Comparative Example 13

A printing medium was prepared under the same conditions as in Example 9 except that rubbing treatment was omitted.

Comparative Example 14

A printing medium was prepared under the same conditions as in Example 9 except that the food additive copper chlorophyll compound was replaced by "Aizen Spilon Green GNH" from Hodogaya Chemical (non-food additive oil-soluble pigment).

Comparative Example 15

A printing medium was prepared under the same conditions as in Example 9 except that the copper chlorophyll compound was replaced by a food colorant consisting of a triphenylmethane pigment (Food additive Pigment Blue No. 1; water-soluble).

Evaluation Results

These printing media were measured for the adhesion between the adhesive layer and the base film, and the adhesion when each printing medium was adhered to the unrubbed bottom surface of the other base film. Water solubility and biodegradability of the pigment were also evaluated. Evaluation results are shown in Table 5 below.

TABLE 5

Printing media containing calcium carbonate and colorant

|  | Example 9 | Co. example 13 | Co. example 14 | Co. example 15 |
|---|---|---|---|---|
| Adhesion to rubbed surface (g/2 cm) | 1000 | 30 | 1000 | 1000 |
| Adhesion to the bottom of the base film (g/2 cm) | 30 | 30 | 30 | 30 |
| Water solubility | No | No | No | Water colored |
| Biodegradability | Yes | Yes | * | Yes |

*means that degradation did not advance only the coated side

Table 5 above shows that the adhesion to the rubbed surface of the base film is strong even when a colorant and an opaque filler were added into the adhesive layer, but the adhesion to the unrubbed bottom surface of the base film is weak.

Polyisoprene rubbers (a kind of natural rubber) can be used as adhesives to manufacture biodegradable printing media.

However, polyisoprene rubbers have the disadvantage that they are deteriorated once they absorb oxygen. When the adhesive surface is exposed to the air, for example, the surface is initially tacky but finally hardens to lose adhesion. Both tackiness and surface hardening are undesirable for printing media.

Therefore, antiaging agents for improving surface stability of polyisoprene rubbers (antioxidants, anti-heat aging agents, vulcanization accelerators, etc.) are needed.

EXAMPLES 10–17

Printing media were prepared in the same manner as in Example 1 except that one or two antiaging agents approved by FDA were added to the polyisoprene rubber solution.

Phenolic antiaging agent A and non-phenolic antiaging agent B were added in the proportions of 1 part by weight and 0 or 0.5 parts by weight, respectively, per 100 parts by weight of polyisoprene rubber.

Phenolic antiaging agent A was Nocrac NS 30 (4,4'-butylidene-bis-(3-methyl-6-tert-butylphenol) or Nocrac PBK, and non-phenolic antiaging agent B was Nocrac TNP based on phosphorus (tris(nonyl phenyl)phosphite), Nocrac MBZ based on imidazole (zinc salt of 2-mercaptobenzimidazole) or Nocceler BZ based on dithicarbamate (zinc di-n-butyl dithiocarbamate) (all available from Ouchi Shinko Chemical Industrial).

The types of antiaging agents A and B used in Examples 11–18 are shown in Table 6 below.

TABLE 6

Types of antiaging agents added

|  | Antiaging agent A | Antiaging agent B |
|---|---|---|
| Example 10 | Nocrac 30 | Not added |
| Example 11 | Nocrac 30 | Nocrac MBZ |
| Example 12 | Nocrac 30 | Nocrac TNP |
| Example 13 | Nocrac 30 | Nocceler BZ |
| Example 14 | Nocrac PBK | |
| Example 15 | Nocrac PBK | Nocrac MBZ |
| Example 16 | Nocrac PBK | Nocrac TNP |
| Example 17 | Nocrac PBK | Nocceler BZ |
| Co. example 16 | Not added | |
| Co. example 17 | Nocrac CD (amine-type) | |
| Co. example 18 | Nocrac 630F (amine-type) | |

Comparative Examples 16–18

As comparative examples, a printing medium added with no antiaging agent (Comparative example 16) and a printing medium using an amine-type antiaging agent Nocrac CD or Nocrac 630F (both available from Ouchi Shinko Chemical Industrial) (Comparative examples 17, 18) were prepared. The types of antiaging agents are shown in parallel in Table 6 above.

Measurement Results

Each printing medium was stored with the adhesive face upward in an incubator at 60° C., and adhesion was assessed by finger touch.

After 6 days, the printing medium was removed from the incubator and measured for self-bonding strength (the adhesion between the rubbed surface of the base film and the adhesive layer) and biodegradability.

The number of days of storage and evaluation of surface state, measurement results of the adhesion between the adhesive layer and the base film of the printing medium after storage as well as evaluation results of biodegradability are shown Table 7 below.

TABLE 7

Evaluation and measurement results

|  | Day 1 | Day 2 | Day 3 | Day 4 | Day 5 | Day 6 | Adhesion to base film (g/2 cm) | Bio-degradability |
|---|---|---|---|---|---|---|---|---|
| Example 10 | ○ | ○ | ○ | ○ | ○ | ○ | 1000 | Yes |
| Example 11 | ○ | ○ | ○ | ○ | ○ | ○ | 1000 | Yes |
| Example 12 | ○ | ○ | ○ | ○ | ○ | ○ | 1000 | Yes |
| Example 13 | ○ | ○ | ○ | ○ | ○ | ○ | 1000 | Yes |
| Example 14 | ○ | ○ | ○ | ○ | ○ | ○ | 1000 | Yes |
| Example 15 | ○ | ○ | ○ | ○ | ○ | ○ | 1000 | Yes |
| Example 16 | ○ | ○ | ○ | ○ | ○ | ○ | 1000 | Yes |
| Example 17 | ○ | ○ | ○ | ○ | ○ | ○ | 1000 | Yes |
| Co. example 16 | X | X | * | X | X | * | 1000 | Yes |
| Co. example 17 | ○ | X | X | X | X | * | 1000 | No |
| Co. example 18 | ○ | ○ | ○ | X | X | X | 1000 | No |

○: Unchanged from before storage
X: Tacky
*: Not adhesive

Table 7 above shows that the adhesion to the rubbed surface of the base film is high even when antiaging agents are added to a polyisoprene rubber.

Phenolic antiaging agents prevented aging of the adhesive layer and kept the surface stable. However, the antiaging effect of amine-type antiaging agents lasted for at most 3 days.

Phenolic, phosphorus, imidazole and dithicarbamate-type antiaging agents did not inhibit biodegradability, but amine-type antiaging agents inhibited biodegradability.

The base film of printing media of the present invention may consist of not only polylactic acid films but also a wide variety of biodegradable surface-rubbed films. A printing medium using a Bionolle film as a biodegradable film other than polylactic acid films is explained below.

Bionolle is a biodegradable high-molecular weight aliphatic polyester obtained by polycondensation reaction of a glycol such as 1,4-butanediol with an aliphatic dicarboxylic acid such as succinic acid or adipic acid.

The molecular structure is represented by the following chemical formula:

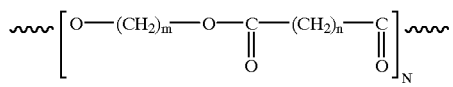

Bionolle films are classified into two types, i.e. polybutylene succinate (PBS) and polybutylene succinate/adipate (PBSA), depending on the combination of m and n in the formula above.

Physical properties of Bionolle films (PBS and PBSA) and a general purpose resin as a comparative example are shown in parallel in Table 8 below.

Table 8 above shows that Bionolles are tough and flexible as evidenced by the high tensile elongation. Therefore, they are suitable for flexibility-requiring applications such as films, sheets, nonwoven fabrics, etc.

EXAMPLE 18

The surface of a base film consisting of a Bionolle film of 40 μm in thickness was subjected to rubbing treatment in the same manner as in Example 1 and a solution containing 5 parts by weight of natural rubber and 1 part by weight of natural rosin dissolved in 94 parts by weight of toluene was applied and dried on the rubbed surface into an adhesive layer of 20 μm in thickness to prepare a printing medium.

This printing medium was measured for the adhesion between the adhesive layer and the base film, the adhesion to stainless steel when the printing medium was adhered to a stainless steel substrate, and film tensile strength and film elongation.

Comparative Example 19

A printing medium was prepared under the same conditions as in Example 18 except that the Bionolle film was not subjected to rubbing treatment and the same measurements as in Example 18 were made.

Measurement Results

Measurement results are shown in table 9 below.

TABLE 9

Printing media using a Bionolle film

|  | Example 18 | Co. example 19 | Commercial product 2 |
|---|---|---|---|
| Adhesion to SUS (g/2 cm) | 70 | 70 | 70 |
| Adhesion to base film (g/2 cm) | 200 | 70 | Not determined |

TABLE 8

Properties of Bionolle film from Showa High polymer

| | | | | | | General purpose resins (Comparative example) | |
|---|---|---|---|---|---|---|---|
| Chemical name | PBS | | PBSA | | | High-density | High-density |
| Grade name | #1001 | #1020 | #3001 | #3020 | PP | polyethylene | polyethylene |
| Density (g/cm³) | 1.26 | 1.26 | 1.23 | 1.23 | 0.90 | 0.95 | 0.92 |
| Melting point (° C.) | 114 | 115 | 94 | 95 | 165 | 130 | 108 |
| Glass translation temperature (° C.) | −32 | −32 | −45 | −45 | −5 | −120 | −120 |
| Crystallization temperature (° C.) | 75 | 75 | 50 | 50 | 120 | 104 | 80 |
| Mass acerage molecular weight (× 10000) | 22 | 15 | 22 | 15 | — | — | — |
| Tensile strength [MPa |kgf/cm²|] | 56.8 |580| | 20.6 |210| | 44.1 |450| | 35.3 |360| | 49.0 |500| | 39.2 |400| | 29.4 |300| |
| Tensile elongation (%) | 600 | 320 | 800 | 450 | 800 | 700 | 800 |
| Modulus in flexure [MPa |kgf/cm²|] | 657 |6700| | 686 |7000| | 323 |3300| | 343 |3500| | 1370 |14000| | 1080 |11000| | 196 |2000| |
| Heat of combustion [KJ/g |cal/g|] | 23.6 |5640| | | 23.9 |5720| | | 44.0 |10500| | | 46.0 |11000| | |
| Degree of crysterllinity (% by mass) | 30~45 | | 20~30 | | 50 | 75 | 30~40 |

PBS: Polybutylene succinate
PBSA: Polybutylene succinate/adipate

TABLE 9-continued

Printing media using a Bionolle film

|  | Example 18 | Co. example 19 | Commercial product 2 |
|---|---|---|---|
| Film tensile strength (kg) | 2.7 | 2.7 | 2.8 |
| Film elpngatopn ratio (%) | 700 | 700 | 500 |

Commercial product 2: Vinyl chloride protect tape from NITTO DENKO

In the case of Comparative example 19, the adhesive may be transferred to the substrate side when the printing medium is separated from the substrate because the adhesion between the base film and the adhesive layer is weak. This is avoided in the printing medium of Example 18.

Thus, the present invention provides a flexible biodegradable printing medium. As natural rubber or rosin is biodegradable, a wholly biodegradable printing medium can be obtained.

Although either a polylactic acid film or a Bionolle film was used for base films 11 in the foregoing examples, the present invention also encompasses base films 11 consisting of two or more layered biodegradable films.

Advantages of the Invention

The present invention provides waste-free printing media by avoiding the use of release films.

The primer layer or adhesive layer formed on the surface of the base film cannot be separated from the base film because the adhesion between the base film and the primer layer or adhesive layer is increased.

The base film is readily disposable because it is biodegradable.

What is claimed is:

1. A windable printing medium comprising:
    a base film comprising a mechanically dry rubbed surface and an adhesive layer disposed on the rubbed surface;
    a printable face formed on a surface of the base film opposite the rubbed surface; and
    wherein, when the windable printing medium is wound into a roll, the printable face of a first wrap of the base film is in contact with the adhesive layer of a second wrap of the base film in rolled form.

2. The windable printing medium according to claim 1 wherein said adhesive layer comprises an adhesive layer starting solution containing an adhesive.

3. The windable printing medium according to claim 1 wherein a biodegradable receiving layer is formed on the surface of said printable face.

4. The windable printing medium according to claim 1, further comprising:
    a rubbing means for rubbing the base film to produce the rubbed surface, wherein the rubbing means is at least one of a cotton cloth and a nylon brush.

5. The windable printing medium according to claim 1 wherein said printable face comprises a rubbed surface.

6. The windable printing medium according to claim 5 wherein a biodegradable receiving layer is formed on the surface of said printable face.

7. The windable printing medium according to claim 1, wherein a primer layer is disposed between the rubbed surface of the base film and the adhesive layer.

8. The windable printing medium according to claim 7 wherein said primer layer contains a biodegradable colorant.

9. The windable printing medium according to claim 7 wherein said primer layer comprises a primer layer starting solution containing an adhesive in an organic solvent.

10. The windable printing medium according to claim 1 wherein said base film is biodegradable.

11. The windable printing medium according to claim 10 wherein said base film comprises an aliphatic polyester.

12. The windable printing medium according to claim 10 wherein said base film comprises a polylactic acid film.

13. The windable printing medium according to claim 12 wherein said polylactic acid film is biaxially oriented polylactic acid film.

14. The windable printing medium according to claim 10 wherein said adhesive layer contains an opaque filler and said opaque filler does not inhibit the biodegradability of said base film.

15. The windable printing medium according to claim 14 wherein adhesive components contained in said adhesive layer are mainly consisted of an adhesive not inhibiting the biodegradability of said base film.

16. The windable printing medium according to claim 15 wherein said adhesive is natural rubber.

17. The windable printing medium according to claim 16 wherein said adhesive layer contains an antiaging agent.

18. The windable printing medium according to claim 15 wherein said adhesive is a polyisoprene rubber.

19. The windable printing medium according to claim 18 wherein said adhesive layer contains an antiaging agent.

20. A windable printing medium comprising:
    a base film comprising a mechanically dry rubbed surface and an adhesive layer disposed on the rubbed surface;
    a printable face formed on a surface of the base film opposite the rubbed surface; and
    wherein, when the windable printing medium is wound into a roll, the printable face of a first wrap of the base film is adjacent to the adhesive layer of a second wrap of the base filmy.

21. The windable printing medium according to claim 20, wherein said adhesive layer comprises an adhesive layer starting solution containing an adhesive.

22. The windable printing medium according to claim 20, wherein a biodegradable receiving layer is formed on the surface of said printable face.

23. The windable printing medium according to claim 20, further comprising:
    a rubbing means for rubbing the base film to produce the rubbed surface, wherein the rubbing means is at least one of a cotton cloth and a nylon brush.

24. The windable printing medium according to claim 20, wherein said printable face comprises a rubbed surface.

25. The windable printing medium according to claim 24, wherein a biodegradable receiving layer is formed on the surface of said printable face.

26. The windable printing medium according to claim 20, wherein a primer layer is disposed between the rubbed surface of the base film and the adhesive layer.

27. The windable printing medium according to claim 26, wherein said primer layer contains a biodegradable colorant.

28. The windable printing medium according to claim 26, wherein said primer layer comprises a primer layer starting solution containing an adhesive in an organic solvent.

29. The windable printing medium according to claim 20, wherein said base film is biodegradable.

30. The windable printing medium according to claim 29, wherein said base film comprises a aliphatic polyester.

31. The windable printing medium according to claim 29, wherein said base film comprises a polylactic acid film.

32. The windable printing medium according to claim 31, wherein said polylactic acid film is biaxially oriented polylactic acid film.

33. The windable printing medium according to claim 29, wherein said adhesive layer contains an opaque filler and said opaque filler does not inhibit the biodegradability of said base film.

34. The windable printing medium according to claim 33, wherein adhesive components contained in said adhesive layer are mainly comprised of an adhesive that does not inhibit the biodegradability of said base film.

35. The windable printing medium according to claim 34, wherein said adhesive is natural rubber.

36. The windable printing medium according to claim 35, wherein said adhesive layer contains an anti-aging agent.

37. The windable printing medium according to claim 34, wherein said adhesive is a polyisoprene rubber.

38. The windable printing medium according to claim 37, wherein said adhesive layer contains an anti-aging agent.

39. A method for fanning a windable printing medium, comprising:

rubbing a surface of a base film in a substantially dry ambient condition;

forming an adhesive layer on the rubbed surface; and forming a printable face on a surface of the base film opposite the rubbed surface, wherein, when the windable printing medium is wound into a roll, the printable face of a first wrap of the base film is in contact with the adhesive layer of a second wrap of the base film in rolled form.

* * * * *

UNITED STATES PATENT AND TRADEMARK OFFICE
CERTIFICATE OF CORRECTION

PATENT NO. : 6,811,847 B2
DATED : November 2, 2004
INVENTOR(S) : Tadasu Kawashima It is certified that error appears in the above-identified patent and that said Letters Patent is hereby corrected as shown below:

Column 18,
Line 34, please replace the word "filmy" with -- film --.
Line 62, please replace the word "a" with -- an --.

Column 20,
Line 3, please remove the word "substantially" after the phrase "a base film in a".

Signed and Sealed this

Twenty-sixth Day of April, 2005

JON W. DUDAS
*Director of the United States Patent and Trademark Office*